United States Patent
Etoh et al.

(10) Patent No.: US 6,285,852 B1
(45) Date of Patent: Sep. 4, 2001

(54) DOCUMENT FEEDER FOR AN IMAGE FORMING APPARATUS

(75) Inventors: Kouichi Etoh; Michiaki Nishimura, both of Nara; Masakazu Suzuki, Yamatokoriyama; Shinichiro Hiraoka, Yamatotakada, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/604,593

(22) Filed: Jun. 27, 2000

(30) Foreign Application Priority Data

Jul. 28, 1999 (JP) .................................................. 11-213252

(51) Int. Cl.$^7$ .................................................. G03G 15/00
(52) U.S. Cl. ........................... 399/367; 399/373; 399/374
(58) Field of Search .................................. 399/16, 17, 18, 399/19, 21, 367, 361, 363, 365, 371, 372, 373, 374; 271/227, 265.01

(56) References Cited

U.S. PATENT DOCUMENTS

| | | | |
|---|---|---|---|
| 5,018,716 | * | 5/1991 | Yoshida et al. ........................ 271/227 |
| 5,385,341 | * | 1/1995 | Yamada et al. ........................ 271/265 |
| 5,680,221 | * | 10/1997 | Takano ........................... 399/367 X |

FOREIGN PATENT DOCUMENTS

| | | |
|---|---|---|
| 60-008865 | 1/1985 | (JP) . |
| 03182478 | 8/1991 | (JP) . |
| 05011523 | 1/1993 | (JP) . |
| 11015210 | 1/1999 | (JP) . |

* cited by examiner

*Primary Examiner*—Arthur T. Grimley
*Assistant Examiner*—Hoan Tran
(74) *Attorney, Agent, or Firm*—Renner, Otto, Boisselle & Sklar, LLP

(57) ABSTRACT

A document is fed from a document tray to a reading station. When the document after being read is discharged by way of a discharge path, the document is halted by a control roller for discharging, instead of being discharged completely. That is, the document is discharged only when the read image is recorded on a sheet and the sheet after recording is discharged completely. When the sheet is not discharged and hence an anomaly is detected, the document set on standby at the discharge position is conveyed along an inverting path and conveyance path to a document registration roller in order to allow the document to be fed to the reading station with its image face presented on the reading position.

10 Claims, 6 Drawing Sheets

DOCUMENT FEEDER FOR AN IMAGE FORMING APPARATUS

BACKGROUND OF THE INVENTION (1) Field of the Invention

The present invention relates to a document feeder for use in an image forming apparatus including an image reading unit (scanner) with a document feeder for reading the image of originals, a recording unit (printer) for reproducing a visual image of image data, inclusive of the read image data, on a recording medium. More specifically, the present invention relates to a document feeder which enables easy handling of the documents to be read when the recording operation is stopped due to an anomaly on the recording unit side.

(2) Description of the Prior Art

A recording unit (printer) forms a visual image from the image data read from the image of an original, the image data supplied from other apparatus and the like, on a sheet as a recording medium, thus producing a hard copy. Typical examples of technologies for such recording devices includes the electrophotographic technique, the ink-jet technique whereby ink is selectively ejected for recording, the thermal-recording technique using a thermal head with a heat sensitive paper or heat transfer ink, and the like.

When such a recording apparatus has an image reading unit for reading the image of an original, i.e., a scanner, the apparatus not only performs a printing function as a printer, but also provides a reading function and a copying function by the combination of these.

A scanner performs the scanning function by illuminating, with light from a light source, a document placed on or as being conveyed along an original table, which is typically formed of transparent material such as glass etc., optically scanning the original, focusing the obtained, reflected light onto an optical receiver of a photoelectric transducer (reading element) such as CCD etc., and outputting an electric signal (analog signal) corresponding to the received amount of light. Then the analog signal is converted into a digital signal, which is output as the image data reproducible as a visual image.

When the recording apparatus for reproducing a hard copy from the above image data, or more simply a printer, is based on electrophotography, the printer performs its function or creates a hard copy by the steps of: charging the photoreceptor surface as an image support at a uniform surface potential; illuminating the photoreceptor with a laser beam from a semiconductor laser which is driven in accordance with the image data so as to form a latent image; and developing it with the toner and transferring the developed image (toner image) to a sheet.

When the printer is based on the ink-jet technology, the printer creates a hard copy with ink by the steps of: receiving the image data picked up by the aforementioned scanner etc., ejecting ink selectively from the ink ejection nozzle in accordance with the image data onto a recording medium (sheet). In a thermal recording method, heat generating elements arrayed in the thermal head are driven selectively to crate a hard copy on heat sensitive paper as a recording medium or to create a hard copy by fusing ink on the ink ribbon and transferring it to a sheet.

Here, in order to optically scan the original, the aforementioned scanner makes a carriage incorporating a light source and reflection mirrors etc., for illuminating the original on the original table, travel in parallel with the original table and focusing the reflected light on the CCD photo-receiving surface as a reading device by means of a focusing lens, so as to read the image of the original, line by line, or a group of lines at a time.

In such an image forming apparatus, while the original documents to be read are conveyed, recording media, i.e., print sheets should be conveyed to the image forming station (recording position) for image formation. During this operation, if a sheet jam occurs on the recording unit side, the operation of the recording unit is stopped and the operation of the scanner side is also stopped at the same time. After the jam cancellation on the recording unit side, the originals should be rearranged on the scanner side conforming to the jam handling.

In this case, instead of replacing all the documents to the initial placement, the user needs to perform troublesome work to sort out the unfinished documents from the finished documents by checking where image forming has been completed, with reference to the jammed sheet.

In order to eliminate such a trouble task, conventionally, conveyance of the originals is controlled continuously without stopping the operation on the scanner side so as to ease the user's document handling even when a paper jam occurs on the recording unit side. For example, Japanese Patent Application Laid-Open Hei 5 No.11523 discloses a configuration in which the documents which have started to be conveyed from the document tray are all discharged by force to the discharge tray. This configuration makes it unnecessary for the user to open the conveyance path to collect the documents therefrom. Thus, the handling step is simplified.

Japanese Patent Application Laid-Open Hei 11 No.15210 discloses a configuration in which once jamming occurs on the recording unit side, it is checked where the document under conveyance is located and whether reading of the document has been finished, based on the sensor arranged in the document conveyance path or at the document reading station, and after the jam cancellation, the document is force-discharged and it is determined based on the above judgement whether the discharged document should be re-fed, to thereby display the judgement result. According to this configuration, the user is able to know if the force-discharged document needs to be read again based on the display content whilst the user is handling the jammed sheet and can, based on this knowledge, sort out the document to be replaced to the document tray.

In contrast, Japanese Patent Application Laid-Open Hei 3 No.182478 discloses a document feeder of a document circulation type in which once jamming occurs on the recording unit side, the document feeder is driven in reverse so as to send back the document on the document conveyance path to the document tray. In accordance with this configuration, the user only needs to remove the jammed sheet while the document feeder selectively controls and feeds again the sent back document from the image forming apparatus to the reading station.

In the above ways, instead of stopping the conveyance of the document on the scanner side at once when paper jam occurs on the recording unit side, some or several document feed manipulations have been devised so as to ease the user's document handling under the consideration of the handling after jam cancellation.

However, force-discharging of documents only elides the removal work of the documents present in the document conveyance path but cannot eliminate the job of replacing the discharged documents to the document tray. In this case, even when the user is informed of the documents to be replaced via the display device, the user may by mistake return the documents to those in the document tray in a wrong manner. For example, the documents should be returned conforming to the delivery configuration, or whether documents are delivered from the topmost or lowermost of the document tray. If the documents are returned without considering the delivery configuration, the order of the documents may be disturbed.

Therefore, if the apparatus is configured so that the documents once delivered from the document tray can be sent back to the document tray, the replacement job of the documents which would have been done by the user can be omitted. However, since the documents need to be conveyed in the reverse direction, the documents tend to jam more easily during reverse conveyance. Actually, when a document is conveyed in the direction opposite to that up to that point, the document may become stuck in the conveyance path due to its setting, curvature and the like. In order to avoid this, the conveyance path should be designed taking into consideration the reverse conveyance. This reduces the design flexibility of the conveyance path. In particular, since the conveyance path is usually designed so that the sheet is conveyed in a predetermined direction, giving consideration to the reverse feed direction will strongly limit the design.

Further, to send the documents back to the document tray, it is necessary to classify the documents depending upon the readout situations, that is, those after being read, those still being read, those before reading and idly circulate the document after being read through the reading station. Therefore, it takes time for the start of reading. Moreover, since, in order to send the document back to the document tray, the document which was delivered out before for being read need to be sent out from the beginning again, the system needs the time up to the first reading for initialization.

Moreover, in a configuration where the document after being read is discharged by, particularly, circulation conveyance, if the documents are fed from the topmost or lowermost, the document after being read is sent back to the topmost or lowermost. Therefore, if an image formed sheet corresponding to the document after being read has not be discharged and becomes stuck, the document needs to be fed to the reading station first. The user needs to collate the documents or performance of idle circulation can deliver the document to the reading station. In this case, such idle circulation is needed, and this not only needs a considerable time before reading but also increases the likelihood of damaging other documents.

In order to solve the above drawbacks, Japanese Patent Application Laid-Open Sho 60 No. 8865 discloses a configuration. In this invention, a suctioning and conveying means is provided above the tray. That is, when the document with its image completely read out is discharged to the discharge tray (the document tray based on document circulation), the document is held in its discharged state by the suctioning and conveyance means instead of being discharged onto the tray. Then, the sheet having the image of the document recorded thereon is discharged, the document being held by the suctioning and conveying means is discharged. If the sheet with the image recorded thereon is not discharged, the document being held is re-circulated by the suctioning and conveying means in order to read the document again. A special, separate conveyance path leading the document to the reading station is arranged at the suctioning and conveying means.

In this configuration, since the document has not been discharged when a sheet jam occurs on the recording unit side, the document can be re-fed to the reading station, thus making it unnecessary for the user to handle the original.

Nevertheless, as a means for holding the document before the determination of whether the document is to be discharged or not, extra suctioning and conveying means and a recirculating path through which the document passes to the reading station are required, resulting in a bulky and complicated configuration. Further, since the suctioning and conveying means is arranged over the document tray, this makes it very troubles some to place the documents to the document tray and remove them therefrom. That is, the suctioning and conveying means should be arranged to be openable with respect to the document feeder.

SUMMARY OF THE INVENTION

It is therefore an object of the present invention to provide a document feeder for an image forming apparatus which can eliminate the drawbacks described above.

Particularly, the present invention is to provide a document feeder which, in a state where the recording operation cannot be performed due to an anomaly on the recording unit side, does not need any manual document handling on the document feeder side, especially any manual handling of the documents which have been already read, to thereby eliminate the user's extra burden.

In order to achieve the above object, the present invention is configured as follows:

In accordance with the first aspect of the present invention, a document feeder for an image forming apparatus that includes a document feeder, a reading means for reading the image of a document conveyed to a reading station and a recording unit for reproducing and recording the image read by the reading means on a recording medium, comprises:

a document tray having documents stacked thereon in a predetermined manner;

a conveyance path for guiding a document from the document tray to the reading station;

a discharge tray for receiving a document after being read therein;

a discharge path for guiding a document after being read to the discharge tray; and an inverting path extending from the discharge path and joining to the conveyance path for inverting the document face so as to present the reverse side of the document to the reading station, and is characterized in that:

a document, from which the image or images having been read, to be conveyed by way of the discharge path and discharged to the discharge tray, is kept on standby at a position in the discharge path, instead of being discharged completely;

the recording unit side has an anomaly detector for detecting the shutdown of the recording operation; and the document kept at the discharge position is discharged, under the conditions that the recording medium having thereon the image or images of the document being kept at the discharge path has been discharged without any anomaly detection by the anomaly detector.

In accordance with the second aspect of the present invention, the document feeder for an image forming apparatus having the above first feature is characterized in that when the operation of the recording unit side has been shut down based on the detection of an anomaly by the anomaly detector and the anomaly is cancelled so that the recording unit is allowed to operate, the document kept at the discharge position is conveyed to the reading station by way of the inverting path and the conveyance path.

In accordance with the third aspect of the present invention, the document feeder for an image forming apparatus having the above second feature is characterized in that the document standing by at the discharge position while the recording unit has been shut down based on the detection of an anomaly is conveyed by way of the inverting path and conveyance path and idly passed over the reading station and is set on standby so that the side needing to be read of the document will be presented to the reading position, before the anomaly of the recording unit is canceled.

In accordance with the fourth aspect of the present invention, the document feeder for an image forming apparatus having the above first feature further comprises:

a storage means for temporarily storing the image data read through the reading station, and is characterized in that:

the documents stacked are dual-sided documents;

when the images of a dual-sided document is recorded on both sides of the recording medium by presenting the first side of the dual-sided document to the reading station to read the image thereon, inverting the document face whilst conveying it by way of discharge path and inverting path so as to present the second side to the reading station and read the image on thereon, the image of the first side of the document is read so that the read image data is temporarily stored in the storage means, the read image on the second side is directly recorded on one side of the recording medium by the recording unit, then the image based on the image data stored in the storage means is recorded on the other side of the recording medium; and when an anomaly is detected by the anomaly detector during the recording operation of the recording unit, the document after being read is conveyed by way of the inverting path and conveyance path and idly passed over the reading station, a required number of times and is set on standby in the discharge path so that the side needing to be read depending upon the timing of the anomaly detection, will be presented to the reading station.

In accordance with the fifth aspect of the present invention, the document feeder for an image forming apparatus having the above fourth feature is characterized in that when an anomaly on the recording unit side is detected while the first side of the document is being read, the document as its first side is passing over the reading station is conveyed by way of the discharge path, inverting path and conveyance path and idly passed over the reading station, and then is set on standby in the discharge path, at least.

In accordance with the sixth aspect of the present invention, the document feeder for an image forming apparatus having the above fourth feature is characterized in that when an anomaly on the recording unit side is detected while the image of the second side is being read and recorded on the recording medium after the first side of the document has been read and the image data thus read has been stored into the storage means, the document as its second side having passed over the reading station is inverted by being conveyed by way of the discharge path, inverting path and conveyance path and idly passed over the reading station, and then is set on standby in the discharge path, at least.

In accordance with the seventh aspect of the present invention, the document feeder for an image forming apparatus having the above fourth feature is characterized in that the first side of the document being read and the image data thus read being stored into the storage means, the image on the second side being completely read and the read image on the second side being completely recorded on the recording medium, and then when an anomaly on the recording unit side is detected from the time when the image data stored in the storage means is being recorded before the recording medium is discharged, the document from which the image of the second side has been read is inverted by being conveyed by way of the discharge path, inverting path and conveyance path and then is set on standby in the discharge path, and when the recording operation of the recording unit is restarted, the document standing by is directly passed through the inverting path and conveyance path and fed to the reading station so that the image on the second side is read.

In accordance with the eighth aspect of the present invention, the document feeder for an image forming apparatus having the above fifth feature is characterized in that the anomaly detection during reading the first side of the document is of deficiency of the storing process of the image data into the storage means.

In accordance with the ninth aspect of the present invention, the document feeder for an image forming apparatus having the above first feature, further comprises:

a storage means for temporarily storing the image data read through the reading station, and is characterized in that:

the documents stacked are single-sided documents;

the image of an odd-number paged document is presented to the image station so that the image is read, and then the document is discharged directly to the discharge tray by way of the discharge path, and the even-number paged document is presented to the reading station so that the image is read and then the read document is set on standby in the discharge path;

the image of the odd-number paged document is read and the read image data is stored in the storage means; and when the anomaly detector detects an anomaly while the images are recorded on the recording medium by recording the read image data from the even-number paged document on one side of the recording medium and recording the image data of the odd-number paged document stored in the storage on the other side, the document standing by in the discharge path is conveyed by way of the inverting path, conveyance path and idly passed over the reading station and set on standby in the discharge path while the recording unit is shut down based on the detection of the anomaly detector.

In accordance with the tenth aspect of the present invention, the document feeder for an image forming apparatus having the above first feature is characterized in that the anomaly detector detects an anomaly concerning sheet conveyance on the recording unit side.

According to the above configuration, in the document feeder, the conveyance paths and other components which allow a dual-sided document to be guided so that both sides of the document are read are used as they are while instead of discharging completely the document having been fully read to the discharge tray, the document is adapted to be halted in the discharge path. Therefore, when the read image is recorded correctly on the recording media and the recording media is discharged, the document set on standby in the discharge path is discharged directly to the discharge tray.

When an anomaly occurs during the recording operation to the recording media, the recording operation of the recording unit is stopped. When the recording unit is allowed to perform the recording, the document on standby can be conveyed to the reading station by way of the inverting path and conveyance path. Because of this configuration, the user does need to perform troublesome document handling to sort out the unfinished documents from the finished documents and replace them to the document tray when the recording unit side stops the recording due to occurrence of an anomaly such as sheet jam etc.

Further, since the document feeder can use the conveyance path, conveyance means and other components currently provided as they are, the entire apparatus will not become bulky and the documents can be placed onto and removed from the document tray in the same manner as before without the necessity of any troublesome work.

Moreover, since the document feeder does not need to have any special conveyance means, or extra conveyance paths, etc., each conveyance means does not need extra control or the like for guiding the document to a selected conveyance path, thus the control system is simplified.

Here, in the document feeder having the above features, the document on standby while the recording machine is out of operation, is set ready for being discharged. Therefore, the document can be idly conveyed through the inverting path and conveyance path to enable the image of the document to be read, thus making it possible to directly feed the document with the side needing to be read presented to the reading station when the recording operation is restarted. Thus, the document may also be set on standby previously without lengthening the time for reading.

Further, when both sides of a dual-sided document are presented to the reading station so as to be read while the images are being recorded on both sides of a recording medium, the document after being read is temporarily kept on standby in the discharge path. In response to detection of an anomaly on the recording unit side, the document is set by conveying it through the inverting path and conveyance path, so that its side to be read can be presented to the reading station by direct feed of the document when the recording operation of the recording unit can be restarted. Therefore, when the recording operation is restarted, the document is quickly fed to the reading station so as to be read, thus eliminating the time delay to the start of reading.

For the case where the images of single-sided documents are read so as to reproduce the read images on recording media in duplex, the read image data of an odd-number paged document is stored into the memory means and the document after being read is discharged outside without halt in the conveyance path. For an even-number paged document, the document after being read is set on standby for being discharged in the discharge path. On the recording unit side, the data read from the image of even-number paged document is directly recorded on one side of a recording medium and the image data of the odd-number paged document stored in the storage means is recorded on the other side.

In this arrangement, if an anomaly such as sheet jam etc. is detected while the recording operation in duplex is effected, the recording operation stops. Even with this operation stopped, since the even-number paged document halted is set ready for being discharged, the reading of the document can be immediately started and recorded. And the even-number paged document is set on standby in the discharge path. Further, the document standing by is idly conveyed by way of the inverting path, conveyance paths and over the reading station and is set again on standby in the discharge path. Accordingly, when the recording operation of the recording unit is allowed to be restarted, the document standing by can be directly fed to the reading station and read, thus eliminating the time delay for reading.

As has been described, in the document feeder of the present invention, even when an anomaly, e.g., sheet jam is detected on the recording unit side, the recording operation stops, and the user only needs to cancel the jammed sheet, without the necessity of handling any documents. Further, the document feeder will not become bulky, using the currently provided conveyance means and conveyance paths, to achieve the above process.

DESCRIPTION OF THE PREFERRED EMBODIMENTS

Figure 1:
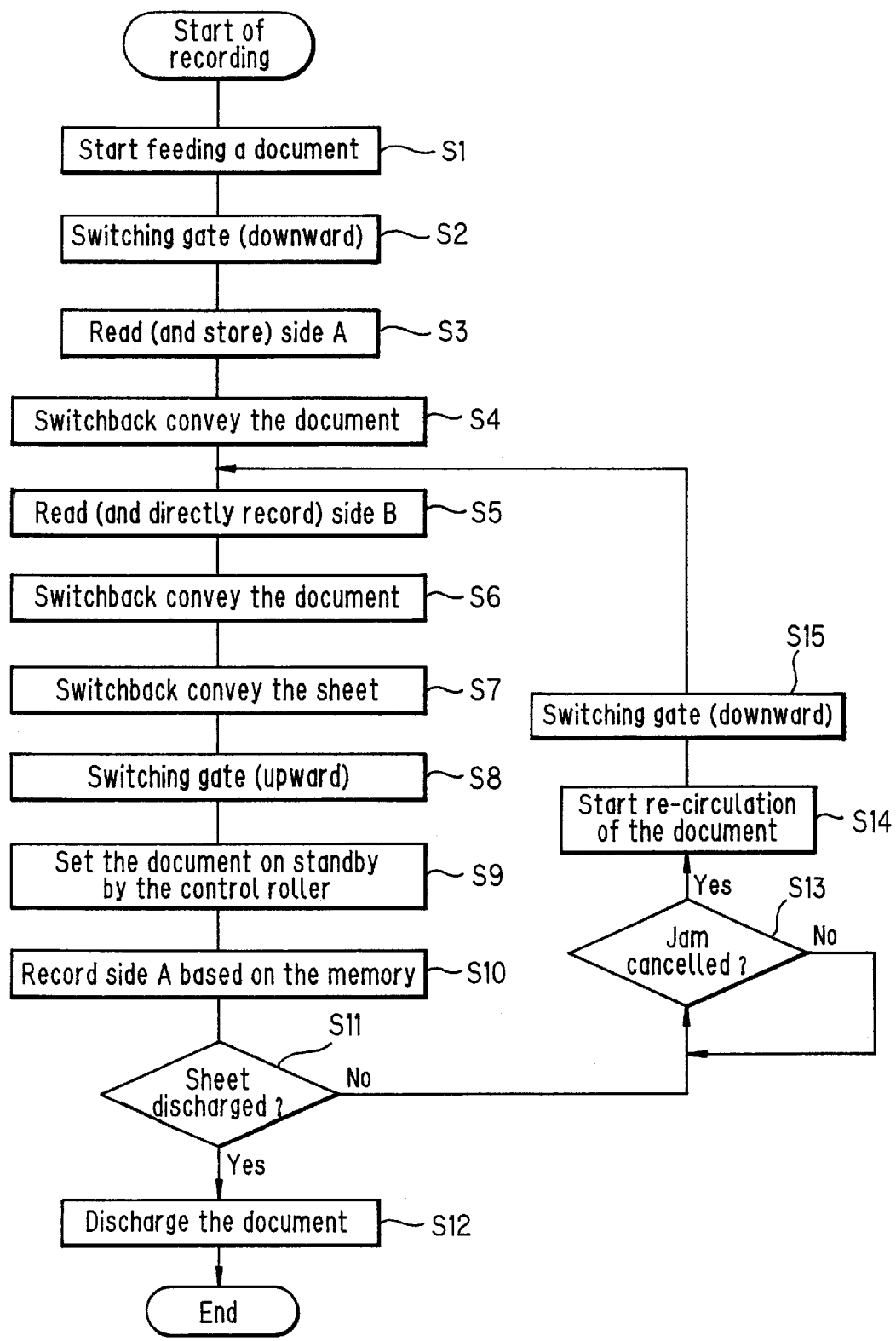
FIG. 1 is a control flowchart for explaining the first embodiment of the present invention, particularly, explaining the document conveyance control for reading the images of the documents.
Figure 2:
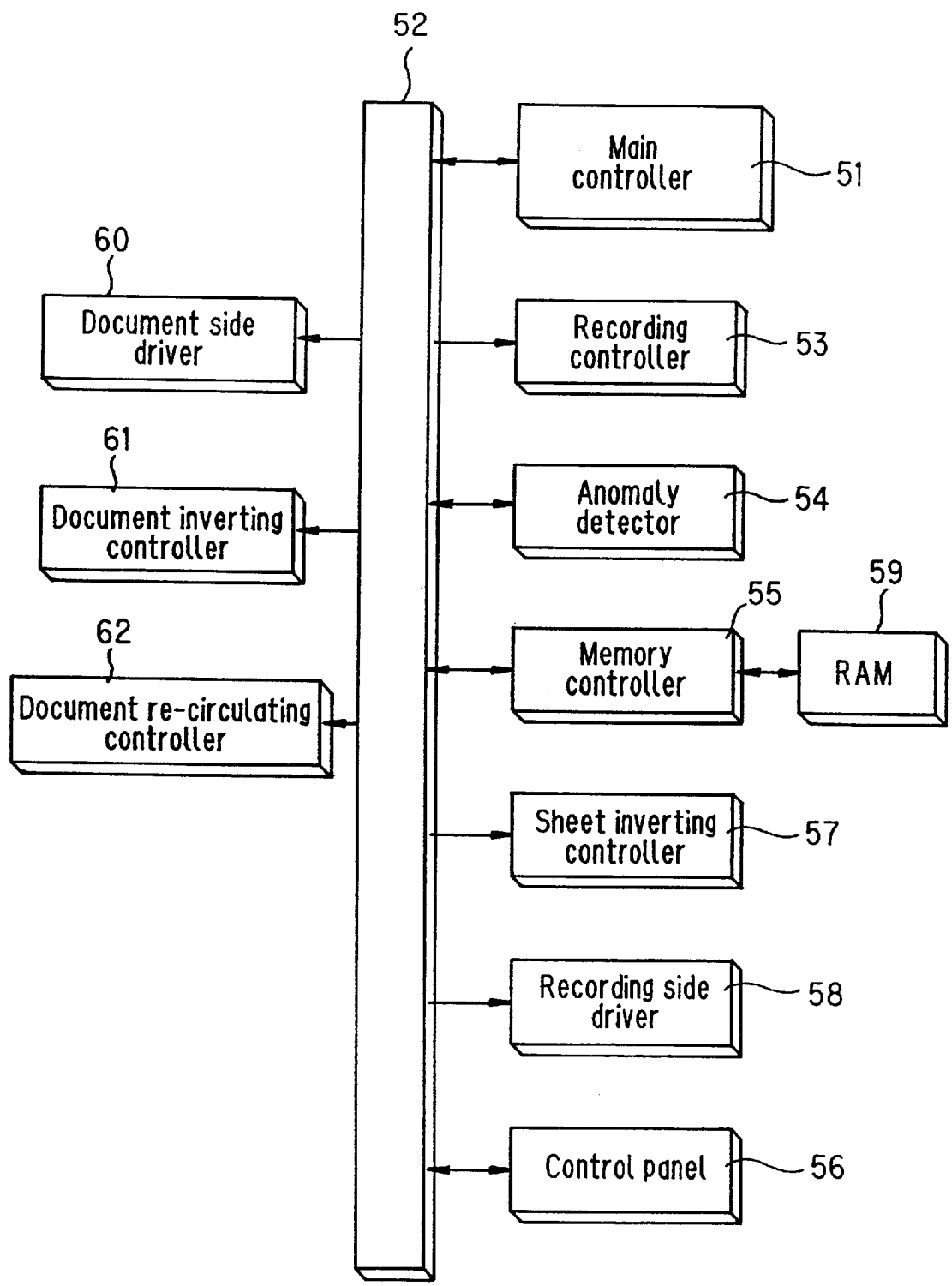
FIG. 2 is a block diagram showing a control circuit configuration of an entire image forming apparatus of the present invention related to FIG. 1.
Figure 3:
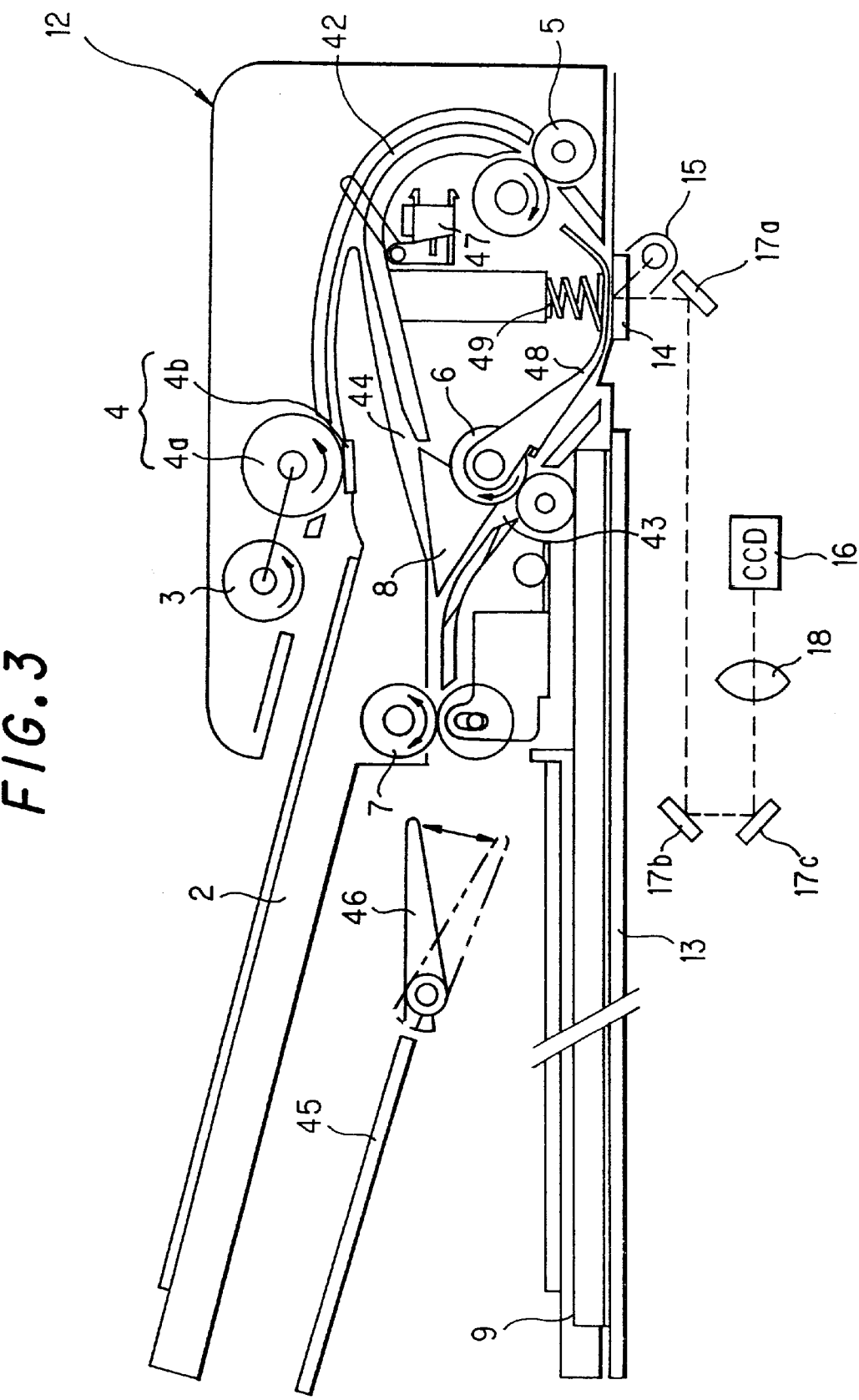
FIG. 3 is a structural view showing the structure of a document feeder including an image reading unit constituting a scanner of the present invention.
Figure 4:
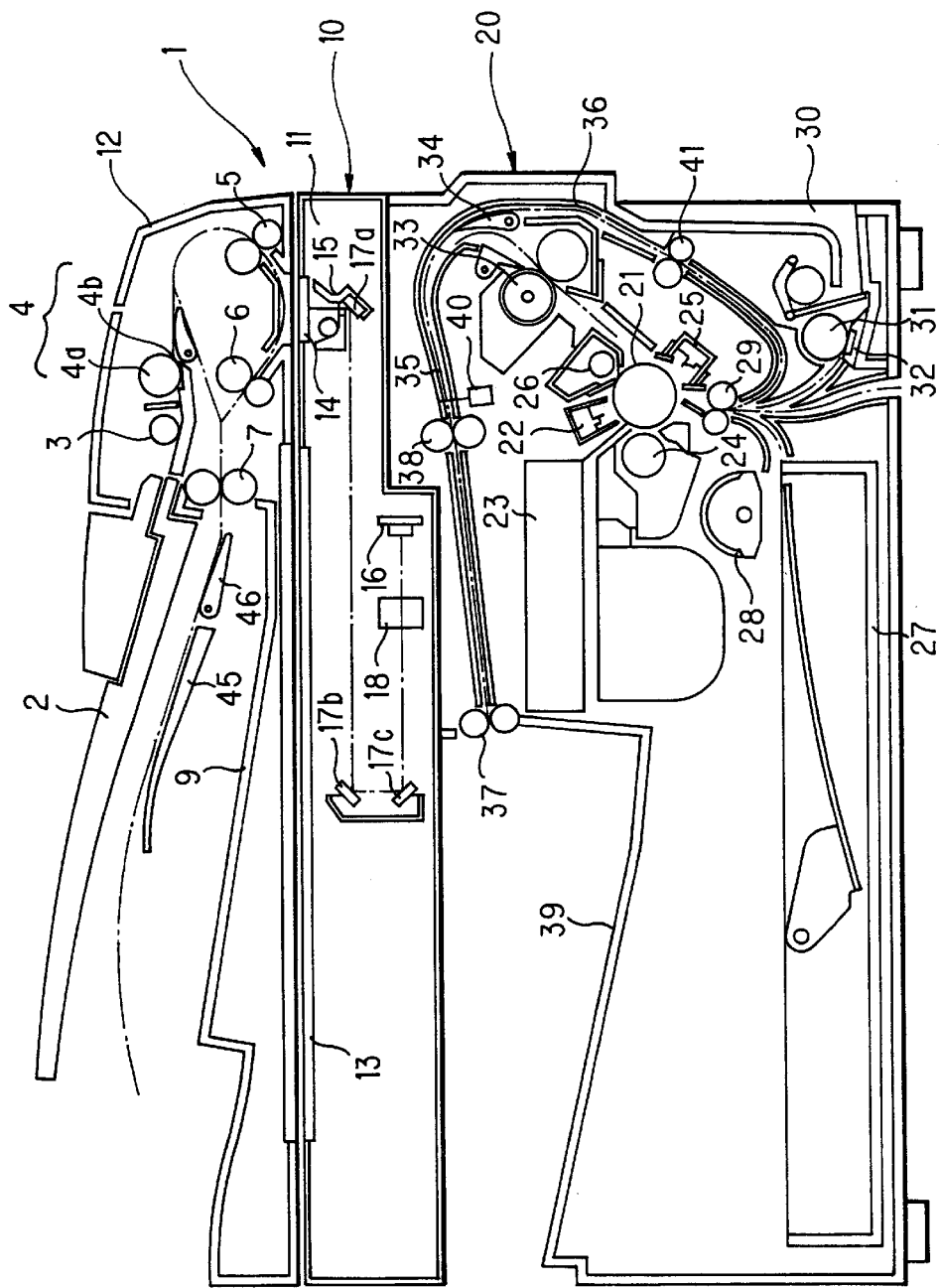
FIG. 4 is a structural view showing a schematic configuration of an entire image forming apparatus including the document feeder shown in FIG. 3.

The embodiments of the present invention will hereinafter be described in detail with reference to the accompanying drawings. FIG. 1 is a flowchart for document conveyance control in a document feeder for explaining the first embodiment of the present invention and for recording operation control on the recording unit side, in particular explaining the conveyance control associated with a sheet jam on the recording unit side. FIG. 2 is a block diagram showing a control circuit of an entire image forming apparatus of the present invention. FIG. 3 is a structural view showing a schematic configuration of a document feeder including an image reading means according to the present invention. FIG. 4 is a structural view showing an entire image forming apparatus including the document feeder shown in FIG. 3.

Referring first to FIGS. 3 and 4, the configuration of an image forming apparatus and the configuration of a scanner as an image reading means in a document feeder in the present invention will be described. The image forming apparatus, designated at 1, of the present invention includes a scanner 10 as an image reading device having a document feeder on the top thereof and a recording unit 20 arranged below scanner 10 and operable with scanner 10 placed thereon.

Scanner 10 is configured of a reading unit 11 as an optical pickup means of original images and a document feeder 12 for conveying documents to the reading station of reading unit 11.

The above document reading unit 11 comprises, as shown in FIG. 4, a transparent original table 13 as the first reading station for reading an original such as a sheet document, thick original (book original etc.) placed thereon by an after mentioned reading means; and a transparent platen 14 as the second reading station for reading a document whilst being conveyed. Reading unit 11 further includes an exposure assembly 15 for emitting light from the underside of original table 13 as the first reading station and transparent platen 14 as the second reading station, a series of reflection mirrors 17a to 17c for leading the reflected light from the original to the photoelectric transducer (to be referred to hereinbelow as CCD 'Charge Coupled Device') 16, an optical lens 18 for focusing the light reflected from the original and passing through the reflection mirrors onto CCD 16, and the aforementioned CCD 16 for converting the focused, reflected light image of the original through optical lens 18 into an electric image signal.

The image information of the original read by reading unit 11, or simply the electric signal from CCD 16 is image processed into data that can be reproduced and recorded by an after mentioned recording unit 20 and then is transferred to the recording portion on the recording unit side. Before the recording portion, the image data of one page is stored in the storage means, as required.

Such image data is supplied to the aforementioned recording portion, or the image data once stored in the storage portion is read out and used for recording by means of recording unit 20.

In order to read the image of an original at the first reading station or the second reading station, reading unit 11 is configured so that the first carriage integrally supporting exposure assembly 15 and reflection mirror 17a can be moved parallel to the original table 13 and transparent platen 14 while the second carriage integrally supporting reflection mirrors 17b and 17c can be moved in the same direction as and at half the speed of the first supporter. While the image of a document being conveyed is read out, exposure assembly 15 located at the position in the drawing illuminates the document being supported at the position of transparent platen 14 and the reflected light is sequentially focused on CCD 16 so as to read the image. When an original is placed on original table 13, the first and second carriages are moved relative to the set original, to thereby optically scan and read the image.

Recording unit 20 receives the image data read by the reading unit 11 of scanner 10 as stated above and outputs a visual image on a sheet as a recording medium. In the present invention, recording unit 20 has an image forming means based on electrophotography. That is, recording unit 20 includes image forming process means arranged opposing and around a photoreceptor 21 as a drum type image support as an image forming means. The process means includes: a charger 22 for uniformly charging the photoreceptor 21 surface; a laser scan unit 23 for illuminating the photoreceptor surface with a light image by scanning a laser beam modulated based on the image data transmitted from the aforementioned scanner 10; a developing unit 24 for developing the static latent image formed after exposure with toner into a visual image; a transfer device 25 for transferring the toner image after development to a sheet as a recording medium being conveyed appropriately; a cleaning unit 26 for removing the leftover toner after transfer and an unillustrated erasing device etc., in preparation for the next image forming. All these elements are arranged in this order.

Recording unit 20 has a sheet conveyance mechanism for feeding a sheet to a transfer station for transferring the toner image formed on photoreceptor 21 as stated above, or the image forming station (recording station). This sheet conveyance mechanism is configured of a feed system for conveying the sheet into the transfer station of the aforementioned transfer device 25, a discharge system for discharging the sheet which has an image recorded thereon and is separated from the photoreceptor after transfer, and a re-circulating system for conveying the discharged sheet into the transfer station again.

First, the feed system in the sheet conveyance mechanism includes: a paper feed cassette 27 arranged removably at the bottom of the image forming apparatus body for storing sheets of a predetermined size; a paper feed roller 28 of a semicircular shape for feeding a sheet P from paper feed cassette 27; and a conveyance roller (registration roller) 29 arranged before transfer station for delivering the fed sheet into the transfer station of transfer device 25. Registration roller 29 controls the start of conveyance of the sheet so the leading edge of the sheet will correspond to the leading edge of the toner image formed on photoreceptor 21, and briefly stops the sheet fed by paper feed roller 28 and aligns the leading edge and then delivers the sheet toward the transfer station in time with the toner image formed on photoreceptor 21.

Beside paper feed cassette 27, a manual paper feeder 30 is arranged on the right side of the apparatus. An unillustrated, removable manual feed tray can be attached to manual paper feeder 30 so that sheets can be set on the manual feed tray. A paper feed roller 31 is also arranged opposing manual paper feeder 30, enabling one sheet paper feed in corporation with a frictional element 32. The sheet fed by this manual paper feed roller 31 is also conveyed into the aforementioned registration roller 29.

Concerning sheet feeding from paper feed cassette 27 and sheet feeding from manual paper feeder 30, the paper feeder 30 has priority of sheet feeding over that of paper feed cassette 27 if an unillustrated detecting means detects set sheets on manual paper feeder 30. When sheets are placed on manual paper feeder 30, paper feeding from paper feed cassette 27 can be enabled if an unillustrated selection switch is operated. When no sheet is set on manual paper feeder 30, sheets are fed from paper feed cassette 27.

Now that the configuration of the feed system of the sheet conveyance device has been described, next, the discharge system of the sheet conveyance device will be described. The sheet having passed through the transfer station has a toner image transferred on the surface opposing photoreceptor 21 by the action of transfer device 25. Since this toner image is unfixed, a fixing unit 33 is arranged downstream of the transfer station. This fixing unit 33 is configured, as is well known conventionally, of a heat roller on the side in contact with the toner image and a squeeze roller opposing this heat roller.

The paper conveyance path separates and is branched into two at a point downstream of fixing unit 33, where a switching gate 34 for guiding the sheet having passed through fixing unit 33 is arranged so as to select one direction. In the present invention, downstream of fixing unit 33 with respect to the conveyance direction branches into a discharge path 35 for the discharge system and re-circulating path 36 for re-circulating system. At the branch point, the aforementioned switching gate 34 is arranged. A discharge roller 37 is arranged near the discharge port of discharge path 35 while a re-circulating roller 38 for conveying the sheet being discharged with an image recording on one side thereon toward re-circulating path 36 is arranged at a point in the discharge path.

Re-circulating roller 38 can be driven in both the normal (discharging) direction and the reverse (re-circulating) direction. The sheet is discharged to an output tray 39 outside the image forming apparatus by the normal rotation of the re-circulating roller 38. A detection sensor 40 for detecting the discharged state of a sheet is arranged on the upstream side of re-circulating roller 38 with respect to the sheet discharge direction. Accordingly, for re-circulating a sheet, when detection sensor 40 detects the rear end of the sheet during the discharging of a sheet by re-circulating roller 38, the operation of re-circulating roller 38 is briefly stopped and driven in the reverse direction, thus making it possible to feed the sheet into re-circulating path 36. At this point, switching gate 34 is set so as to provide communication between discharge path 35 and re-circulating path 36.

Re-circulating system of the sheet conveyance mechanism includes re-circulating path 36 as stated above, in which a conveyance roller 41 for conveying the re-circulated sheet is arranged. The end of this re-circulating path 36 communicates with registration roller 29. In other words, this re-circulating path 36 is formed so as to join to the sheet conveyance paths from the paper feed cassette 27 and from manual feeder 30 in the sheet feed system.

In the above sheet conveyance mechanism, when the image is recorded on one side of a sheet, the sheet fed from paper feed cassette 27 or manual paper feeder 30 is conveyed through registration roller 29 to the transfer station, where the toner image is formed thereon. Then, the sheet is separated from photoreceptor 21 after the transfer station and passes through fixing unit 33 and is guided to discharge path 35 by the selection of switching gate 34. The sheet further passes through re-circulating roller 38 and discharge roller 37 and is discharged to output tray 39. Thus, the image is formed on one side of the sheet and the sheet is discharged.

Next, image recording on both sides of a sheet will be described. In this case, first, the sheet with an image formed on one side thereof passes through fixing unit 33 and is guided to switching gate 34 to be discharged by re-circulating roller 38. During this discharging by the re-circulating roller, the sheet rear end is detected by detection sensor 40. In response to this detection, re-circulating roller 38 is stopped rotating in the normal direction and is driven in reverse. At this moment, discharge roller 37 is stopped and set free. Then, the sheet moves with its rear end frontward and is guided from discharge path 35 to re-circulating path 36 by the selection of switching gate 34. The sheet is conveyed past conveyance roller 41 located in re-circulating path 36 to registration roller 29, where the sheet is stopped.

The sheet being stopped at the position of registration roller 29, since the feed direction has been reversed (or switchback conveyed) by re-circulating roller 38, is set with its image formed face (the face on which the image has been formed previously) directed in the opposite direction. Then, a toner image corresponding to the reverse side (or front side) is formed on photoreceptor 21 and the conveyance by registration roller 29 is started in synchronization with the toner image. Thus, another image (toner image) is recorded on the opposite side of the previously recorded sheet, and the sheet passes through fixing unit 33 and then is discharged.

(The First Embodiment of the Present Invention)

Now, description will be made on a document feeder which constitutes scanner 10 of the present invention and is used in cooperation with the recording unit 20 thus configured as above which allows a sheet as a recording medium to be image formed on one side or both sides.

In the image forming apparatus of the present invention, in order to record images on one side or both sides of a sheet, images on originals are read to record them. The device for conveying documents to the document reading station stated above will be described with reference to FIG. 3. The document feeder shown in FIG. 3, is configured, as described already, so that the documents are fed sheet by sheet to transparent platen 14 for reading documents.

Document feeder 12 constituting scanner 10 includes: a document tray 2 for stacking original documents thereon and delivering them; a pickup (paper feed) roller 3 that starts delivery from the topmost document on the document tray 2; a separation and conveyance means 4 made up of a feed roller 4a for delivering the original document picked by pickup roller 3, sheet by sheet and a frictional element 4b; a document registration roller 5 for delivering the document fed by separation and conveyance means 4 to the reading station or transparent platen 14; a conveyance roller 6 for conveying the document after being read; and a control roller 7 for discharging or switchback conveying the document fed by conveyance roller 6.

Document feeder 12 further includes a number of conveyance paths for guiding the document conveyed by the aforementioned conveyance means to the target points. The conveyance paths includes: a first conveyance path 42 leading the document that has passed over separation and conveyance means 4 to the reading station i.e., transparent platen 14 by way of document registration roller 5; a discharge path 43 for guiding the document after being read to control roller 7 by way of conveyance roller 6; and an inverting path 44 leading to document registration roller 5 for presenting the reverse side of the document to transparent platen 14.

The above inverting path 44 is formed so as to join to first conveyance path 42 at a point of the first conveyance path. Discharge path 43 joins to inverting path 44 near control roller 7. A switching gate 8 is provided at the juncture so as to separate discharge path 43 and inverting path 44.

A document discharge tray 9 and an inverting tray 45 thereabove are arranged in association with the document discharging direction by control roller 7. A switching gate 46 is arranged in association with control roller 7 so as to selectively guide each document to either of these trays.

Document registration roller 5 is arranged before transparent platen 14 or the document reading station. This roller briefly stops the document fed by way of first conveyance path 42 and delivers the document to transparent platen 14 at a predetermined timing in order to control the start of document reading. In time with this, in document reading unit 11, exposure assembly 15 and reflection mirror 17a in the scanner system are moved to the position shown in the drawing and kept at that position, where the illumination control of exposure assembly 15 is performed.

Sheet documents are placed faceup on document tray 2, for example. More explicitly, the single-sided documents and dual-sided documents are stacked on document stacking tray 2 with the first page of the documents placed at the top. This stacking order is a mere example, and the documents may be stacked in a different manner depending upon the document conveyance mode, conveyance path configuration and other factors. Therefore, the documents may be set facedown.

In order to read single-sided documents, the documents are set faceup on document tray 2. From the documents thus set, the topmost document is fed by pickup roller 3 to document registration roller 5, by way of separation and conveyance means 4. At this point, document registration roller 5 is actuated to deliver the document to transparent platen 14 in time with the start of reading.

While the document is conveyed at a constant speed by document registration roller 5 and conveyance roller 6 along discharge path 43, the image on the document is read line-wise or line by line by CCD 16 of reading unit 11 whilst kept still at the position shown in the drawing. When the rear end of the document after the reading operation is detected by document detection sensor 47 arranged downstream of the juncture between inverting path 44 and first conveyance path 42, with respect to the document conveying direction, the next document is delivered from tray 2.

The previously read document is discharged facedown to discharge tray 9 passing over control roller 7. In this case, switching gate 46 is set at the state shown by the solid line in FIG. 3.

In this way, the documents on document tray 2 are sequentially fed sheet by sheet to the reading station or transparent platen 14, and the image on each document is captured as it is conveyed, then each document is discharged (with the read face) facedown onto discharge tray 9. Thus, the documents discharged can be stacked on discharge tray 9 in the same order as that set on document tray 2.

For reading the images of dual-side documents, the documents are stacked on document tray 2 with the first page and the odd pages up. From the documents thus set, the topmost document is fed and conveyed at a constant speed over transparent platen 14 so that the image is captured, and then the document is sent to control roller 7 by way of discharge path 43. In this case, switching gate 46 is positioned at the state indicated by the broken line in the drawing so that the document is guided toward inverting tray 45. When the rear end of the document, after detection by detection sensor 47, passes over transparent platen 14 and almost reaches control roller 7, the document is stopped. The time from the passage of the rear end over detection sensor 47 up to its arriving at control roller 7 while the image of the original is being captured can be simply determined from the conveyance speed of the document, and is constant. Therefore, control roller 7 is stopped before the rear end of the document reaches control roller 7, hence the document is halted with its rear end held between control rollers 7. From this state, when control roller 7 is reversed, the document is switch-back conveyed with its rear end forwards. In this case, switching gate 8 is shifted so as to lead the document to inverting path 44. Thus, the document passes through inverting path 44 and is sent to first conveyance path 42, then temporarily stopped at document registration roller 5 so as to be ready for the reverse side of the document to be read.

Subsequently, conveyance is started in synchronization with the reading station and the reverse side of the document is read. When reading completes, the document is lead again to switching gate 46 passing over conveyance roller 6 and control roller 7 along discharge path 43, and delivered to inverting tray 45. Then, in order to arrange the pages of the document in the same order as that set on document tray 2 when it is finally discharged, control roller 7 stops rotating when the rear end of the document almost reaches the control roller. As control roller 7 is reversed, the document is switchback circulated through inverting path 44, first conveyance path 42, document registration roller 5, idly passing over the reading station to discharge path 43.

Since switching gate 46 has been shifted to the position shown by the solid line when the document idly conveyed is discharged, the document is discharged onto discharge tray 9. This sequence is performed for the next document so that the images of dual-sided documents are read sequentially in the same manner.

In FIG. 3, a component 48 arranged at the document reading station opposing transparent platen 14 is a position-restraining member. This position restraining member 48 is to bring the document, regardless of its thickness, into close contact with transparent platen 14, and is urged downward (toward the transparent platen) from the rear side, by a spring 49 such as a spiral coil spring, cylindrical spring etc., arranged on the opposite side to the document.

FIG. 2 is a block diagram showing a control circuit configuration of an entire image forming apparatus shown in FIG. 4, including the control of document feeder 12 of the present invention. The control circuit shown in FIG. 2 includes a main CPU (main controller) 51 for controlling the entire image forming apparatus. This main CPU is connected by a bus line 52 to other controllers, memory, controllable portions of the image forming apparatus, and motor drivers etc., in relation to the document conveyance according to the present invention. More explicitly, the main CPU is connected via bus line 52 with a recording controller 53 in recording unit 20, an anomaly detector 54 for detecting anomalies, such as sheet jamming and other anomalies, in recording unit 20, a memory controller 55 for storing the data read from the original images and other data needed for image forming into memory as the storage means, such as RAM, for example, a control panel 56 for allowing the user' selection of image forming conditions including setting of the copy number, magnification setting, density setting and the like, an inverting controller 57 for inverting control (switchback conveyance) of a sheet when duplex recording is performed on the recording unit side, a recording side driver 58 for motors, clutches, etc. required for conveying sheets on the recording unit side, a reading side driver 60 for motors, clutches, etc. required for conveying documents in document feeder 12 for the scanner, a document inverting controller 61 for inverting and conveying a document by control roller 7, and a document re-circulating controller 62 for re-circulating a document, the main feature of the invention, when an anomaly is detected on the recording unit side.

The above main controller 51 controls the entire image forming apparatus as stated above, and controls recording controller 53 of recording unit 20 and document reading unit 11 of scanner 10, in response to the instruction of the start of image forming from control panel 56, for example. The control to be effected includes control of reading side driver 60. Therefore, all the rollers etc., for feeding and conveying the documents described with reference to FIG. 3, start to be driven. Thereby, a document is fed into the reading station, or transparent platen 14, where the image is read.

The image information (data) thus captured is sent to the process portion for image forming, especially, laser scan unit 23, under the control of controller 53 on the recording unit 20 side. Alternatively, the data is once stored in RAM 59 by way of memory controller 55. In this case, since the data is directly sent to laser scan unit 23 when the document is of a single sided one, recording controller 53 performs recording control based on the data. When the document is of a dual-sided one, the image data on the obverse side of the document to be read first is stored into RAM 59. Then the dual-sided document face is inverted so that the image data on the reverse side (rear side) can be read. This data on the reverse side is transferred directly to laser scan unit 23, based on which recording is controlled.

In parallel with this, recording side driver 58 on the recording unit 20 side selectively drives the associated rollers for feeding the sheet in response to the instruction of starting image forming from control panel 56. As a result, a sheet selected from a selected paper feeder, either manual paper feeder 30 or paper feed cassette 27, is delivered to registration roller 29, whereby the sheet is set on standby.

When the read data is directly transferred from the scanner side to laser scan unit 23, recording controller 53 starts image forming based on the data. Alternatively, laser scan unit 23 can load the image data stored once in RAM 59 so as to carry out image forming, in a similar manner. The image formation is performed by driving the process means and creating the toner image on photoreceptor 21. The toner image thus formed is transferred to the sheet standing by at registration roller 29. For this purpose, registration roller 29 is actuated to start conveyance at a controlled timing so that the leading edge of the toner image will correspond to the front end of the sheet.

Here, when image formation(recording/printing) is carried out on both sides of a sheet, two pages of originals are grouped as one set and the data of the image captured first is once stored into RAM 59 and the data of image captured next is transferred directly to laser scan unit 23 to be used for image formation. Therefore, the sheet standing by at registration roller 29 is formed with the image based on the subsequent image data. Then, inverting controller 57 controls re-circulating roller 38 so as to stop temporarily and then rotate in reverse, thus switchback conveying the sheet through re-circulating path 36 to registration roller 29, where the sheet is again stopped on standby. Then, the image data previously stored in RAM 59 is read out, based on which recording control, that is, image formation and transfer of the formed image to the rear side of the sheet standing by at registration roller 29, is carried out.

Document inverting controller 61 is used when both sides of the images of dual-sided originals are read. Illustratively, the image on the first side (the odd page or side A) of a dual-sided document is read first. Then, control roller 7 is stopped at the timing when the rear end of the document almost reaches control roller 7 and driven in the direction opposite to the normal rotation heretofore. Thereby, the movement of the document is switchback conveyed with its rear end forwards, so that the document is conveyed from inverting path 44 to the first conveyance path 42 and stopped at the position of document registration roller 5 on standby. Document conveyance controller 61 performs the aforementioned switching control of the rotational direction of control roller 7. The control 61 also controls switching gates 8 and 46 so as to govern the guidance of the document to inverting tray 45 and the guidance from inverting path 44 to first conveyance path 42.

The aforementioned RAM 59 constituting the memory should at least have a memory capacity for storing the image data for one page of a document. Memory controller 55 controls this RAM 59 so that the image data is stored (written) therein and the stored image data is read out therefrom.

The anomaly detector on the recording unit side may employ a well-known, conventional configuration, and detects a she et jam etc. of a conveyed sheet, for example. In addition, the detector may also detect image forming defects such as development defects, charging defects, fixing defects and the like. As an example of fixing defect, the detector, for example, detects a state where the fixing temperature does not reach the predetermined temperature. That is, the detector is able to detect fixing anomalies and the like when the fixing temperature does not rise even if the temperature detecting sensor and heat source are driven for a predetermined period of time.

Document re-circulating controller 62 according to the present invention, controls the conveyance system so that the document which has been just read is temporarily set on standby with its rear end held between control rollers 7, instead of being completely discharged to the discharge tray, while occurrence of an anomaly on the recording unit side as stated above is checked. When a sheet jam or the like occurs before completion of image formation of the document on a sheet, the controller 62 causes the document to be conveyed and read again.

Specifically, the document which has been read is set on standby whilst being held between control rollers 7 with its page order collated. If an anomaly occurs which does not allow the image of the document to be formed on the sheet, it is necessary to read the image of the document again. In this configuration, when recording unit 20 becomes ready for the recording operation to be restarted, the standby document is fed to the reading station where the image is read. At this point, since the document has been held in a state so as to be ready for being discharged, in some cases the document may not present the correct face to be read to the reading station. In such a case, while the recording operation by the recording unit is stopped due to anomaly, document re-circulating controller 62 performs such control that the document may and should be idly conveyed by way of inverting path 44, conveyance path 42 and the like so as to make the document ready for being read.

Instead, if it is detected that the sheet which has been formed with images is discharged without being disturbed by sheet jamming or other anomalies, the document standing by at the control roller 7 in discharge path 43 is finally discharged to discharge tray 9 under control of reading side driver 60.

(Document Conveyance Control of the Present Invention)

Now, the document conveyance control of the present invention, that is, conveyance control of a document by document re-circulating controller 62 will be described in detail.

Particularly, in the present invention, RAM 59 as a storage means capable of storing the image data of one page of a document is provided. Therefore, when image recording is performed on one side of the sheets, the data that has been read from the image of a document can be stored using RAM 59, hence the data stored in RAM 59 can be used again if sheet jamming etc., occurred during image formation of the image data. Therefore, when image forming is performed based on the image data that has been once read and stored, the document can be discharged without the necessity of making the document stand by at the position of control roller 7.

However, when image forming is performed based on the image data that is read and directly supplied to laser scan unit 23, it is impossible to continue image forming if a sheet jam occurred. In such a case, the image of the document should be read again. In other words, in the case where recording unit 20 is making a recording operation while the image data is read and supplied directly to laser scan unit 23, if an anomaly occurred on the recording side, it is necessary to read the image of the document again.

(D-D Mode)

The image forming operation in the mode for forming images on both sides of a sheet and the document conveyance control will be described following the control flowchart shown in FIG. 1. The D-D mode is a mode in which the images of a dual-sided document is recorded on both sides of a sheet as recording media.

As has been described above, the documents are stacked on document tray 2 with the first page (page 1) set at the top. Each document has images on both sides and the images on the two sides are read. When the stacking of the documents is complete, the start switch on control panel 56 is operated. At this point, before operating the starting switch, the user sets the image forming conditions, in particular, recording conditions under which duplex printing is performed for dual-sided documents.

In response to the activation of the start switch, the image forming process shown in FIG. 1 starts. First, at Step S1, the topmost document stacked on document tray 2 starts to be delivered. At this point, switching gate 46 is set into the down position indicated by the broken line in FIG. 3 so that the document will be guided to inverting tray 45 (S2). Reading unit 11 for image reading is kept standing still at the position shown in FIG. 3.

The document that has been fed first passes through first conveyance path 42 and reaches document registration roller 5, where it is temporarily stopped. Then the document is delivered in time with reading unit 11 and conveyed by document registration roller 5 to the reading station at which transparent platen 14 is located. The document as it being conveyed is presented so that the first side (side A or odd page) faces transparent platen 14 and the image is sequentially focused on CCD 16, whereby the image is read. The image data thus read is temporarily stored into RAM 59, the memory (S3). At the same time, on the recording unit 20 side, a sheet has been previously sent to registration roller 29 and set on standby.

As the first side of the document is sequentially read, the document is lead along discharge path 43 to control roller 7 and guided by switching gate 46 toward inverting tray 45. When the rear end of the document is detected by detection sensor 47 arranged near and downstream of the juncture of inverting path 44 and first conveyance path 42, it will then almost reach control roller 7 after a lapse of the time constant from that detection. At this timing, the normal rotation of control roller 7 is stopped and the document is switchback conveyed (S4) so as to read the image on the opposite side (side B, even page) of the document. This operation is controlled by document inverting controller 61 shown in FIG.2, or simply by rotating control roller 7 in the reverse direction. At this moment, switching gate 8 is set so that the document will be guided along inverting path 44 to the juncture at which the path 44 meets first conveyance path 42.

The document thus switchback conveyed is temporarily stopped at document registration roller 5, and fed to transparent platen 14 in synchronism with the operation of reading unit 11. During this conveyance, the image on the even page (side B, the second side) or on the underside of the document is read. The image data of the underside thus read is directly supplied to laser scan unit 23 on the recording unit 20 side (S5), so that the laser scan unit performs image recording on the sheet based on the data.

When the rear end of the document with the already read image on its underside almost reaches control roller 7 as stated above, the normal rotation of control roller 7 is stopped and control roller 7 is rotated in reverse for switchback conveyance (S6). This is effected in order to discharge the dual-sided document with its first side down to discharge tray 9. Specifically, the document is conveyed again passing through inverting path 44 and first conveyance path 42 and fed to document registration roller 5. In this case, the document is continuously conveyed over transparent platen 14 without the necessity of temporarily stopping the document. That is, the document is idly conveyed while no reading is effected at this position.

On the other hand, the sheet standing by at registration roller 29 starts to be delivered from that position so as to be in register with the image, reproduced from the underside of the document, formed on photoreceptor 21. While the recording of the image continues, the sheet is conveyed through fixing unit 33 to re-circulating roller 38. As soon as the rear end is detected by detection sensor 40, the rotation of re-circulating roller 38 is stopped. Then, in order to form an image on the underside of the sheet, re-circulating roller 38 is rotated in the reverse direction so that the sheet is guided along re-circulating path 36 and then conveyed by conveyance roller 41 up to registration roller 29. Thus the sheet is inverted upside down (switchback conveyed) and fed(S7).

Thereafter, on the document side, the document which was switchback conveyed at Step S6 and idly conveyed through the reading station is held between control rollers 7 in discharge path 43 waiting for being discharged to discharge tray 9. That is, the document thus idly conveyed passes along discharge path 43 and is fed to control roller 7 until its rear end is positioned at a point just before control roller 7. In this state control roller 7 is stopped, therefore the document stands by while it is discharged halfway from discharge path 43. Since upper switching gate 46 is set into the position indicated by the solid line in FIG. 3 (S8), the document is guided to discharge tray 9 by switching gate 46 and waiting for at that position (S9).

While the document is thus handled, on the recording unit side, the sheet with one side formed with an image is fed to registration roller 29 and set on standby. The sheet on standby starts to be conveyed to the transfer position in time with the recording of the image. That is, the image on the first side of the document previously captured is loaded from RAM 59 so as to be formed on photoreceptor 21 (S10). The loaded image data from RAM 59 as the memory is supplied to laser scan unit 23. By this image formation, the images of the dual-sided document are reproduced on both sides of the sheet, and the sheet with images formed on both sides thereof passes over fixing unit 33 and is conveyed by re-circulating roller 38 and discharge roller 37 to output tray 39.

If the sheet to be discharged becomes jammed while the images are formed on both sides of a sheet, this is detected by anomaly detector 54 at S11. When the sheet is normally discharged, detection sensor 40 detects this and based on the knowledge that the sheet has been discharged correctly, control roller 7 starts to be rotated in the normal direction to discharge the document standing by at the position of control roller 7 on the document side (S12). In this case, the document is discharged onto document discharge tray 9 with its first side or odd page facedown.

When the sheet being formed in duplex becomes jammed halfway, the images formed on the sheet are wasted. Therefore, the images should be formed once more. When sheet jam is detected (S11), jam cancellation needs to be done. Therefore, it is checked whether the jammed sheet has been removed (S13) on the recording unit side. If jam cancellation is confirmed, re-circulating control of the document is actuated by document re-circulating controller 62 shown in FIG. 2.

First, in response to the jam detection stated above, the document of which the second side was read and which is set on standby at the position of control roller 7 with its first side facedown, is switchback conveyed by the reverse rotation of control roller 7 (S14). The document is conveyed up to document registration roller 5 by the switchback conveyance and set on standby at that position. The document then is conveyed to the reading station or transparent platen 14, at controlled timing.

At this point, on the recording unit side, if restart of image formation is instructed after jam cancellation, a sheet is fed and set at the registration roller while the document is switchback conveyed. In response to the start of switchback conveyance of the document, the switching gate is set into the position indicated by the broken line (S15).

In the above way, the document is switchback conveyed, the sheet is fed, and then the second side of the document is read again. This data is directly supplied to laser scan unit 23 on the recording unit side, where the image based on the data is formed. For this image forming, the sheet on standby at registration roller 29 starts to be conveyed in time with the rotation of photoreceptor 21. In order to perform this process, the procedures from Step S5 and thereafter shown in FIG. 1 are sequentially effected in the manner described previously.

After step S5, image recording on both sides of the sheet has been completed. Again, the discharge of the sheet is checked at Step S11. If a sheet jam is detected, the operation goes to Step S13 and then the control following the procedures described above will be performed. When no sheet jam is detected, the document set on standby at the position of control roller 7 is discharged (S12) so that the document is discharged to discharge tray 9 with the first side facedown as stated above.

If there are documents present on document tray 2 after the first sheet of document was discharged in the above way, the above processing control from Step Sl will be repeated to read the documents.

As has been described heretofore, when images are formed on both sides of a sheet, the document is set on standby at the position of control roller 7 for being discharged and for being switchback conveyed, instead of being discharged completely. When the recording operation is effected properly without any anomaly detection and the sheet is discharged, then the document is finally discharged.

On the other hand, if sheet jam or other anomalies are detected on the recording unit side, the document on standby is adapted to be fed again to the reading station. Therefore, the user does not need to either replace the document into document tray 2 each time or check the document to be replaced. Thus, this configuration makes it possible to eliminate troublesome manual document handling and ease the user's burden.

Further, in document feeder 12 of the present invention, the currently existing components, namely, first conveyance path 42, discharge path 43, inverting path 44, switching gate 8 for selectively joining these paths, feed roller 3, registration roller 5, conveyance roller 6 and control roller 7 which can be rotated in normal and reverse directions, can be directly used. Since there is no need to provide any special conveyance means and extra conveyance paths, it is possible to achieve the desired effect with a very simple configuration.

Further, in accordance with the flow shown in FIG. 1, it is assumed that an anomaly on the recording unit 20 side is detected when duplex image forming on a sheet is performed while the document is set on standby for being discharged. Therefore, the document on standby for being discharged is set so that the desired side to be read will be presented to the reading station by way of document registration roller 5 after switchback conveyance. So, when the anomaly on the recording unit 20 side is cancelled and the recording operation is restarted, the document is directly presented to the reading station and the reading operation is effected as shown in Step S14. Thus, it is possible to instantly have the desired side of the document to be read presented to the reading station when the recording operation is restarted.

(Consideration on the Anomaly Detection Timing in the Document Conveyance Control of the Present Invention)

In the above, description was made as to re-circulating control of a document due to sheet jam occurring while the image is recorded on the second side of the sheet in the duplex image forming operation with dual-sided documents to be read. However, sheet jam will occur not only while the image is formed on the second side of a sheet but also while the image is formed on the first side of a sheet.

Particularly, in the control flow shown in FIG. 1, the recording operation of recording unit 20 is stopped when an anomaly is detected while the image is being formed on a first side (one side) of a sheet in the procedure at Step S5. That is, if a sheet jam or the like occurs during the procedure of Step S5, the document feeder side should perform a re-circulating operation associated with the situation.

The procedures for this case will be explained with reference to FIG. 5. Also in this case, when the control following the flow shown in FIG. 1 is effected, the document or the operation of the document feeder can be normalized without needing the user' manual handling to replace the document to the document tray.

Figure 5:
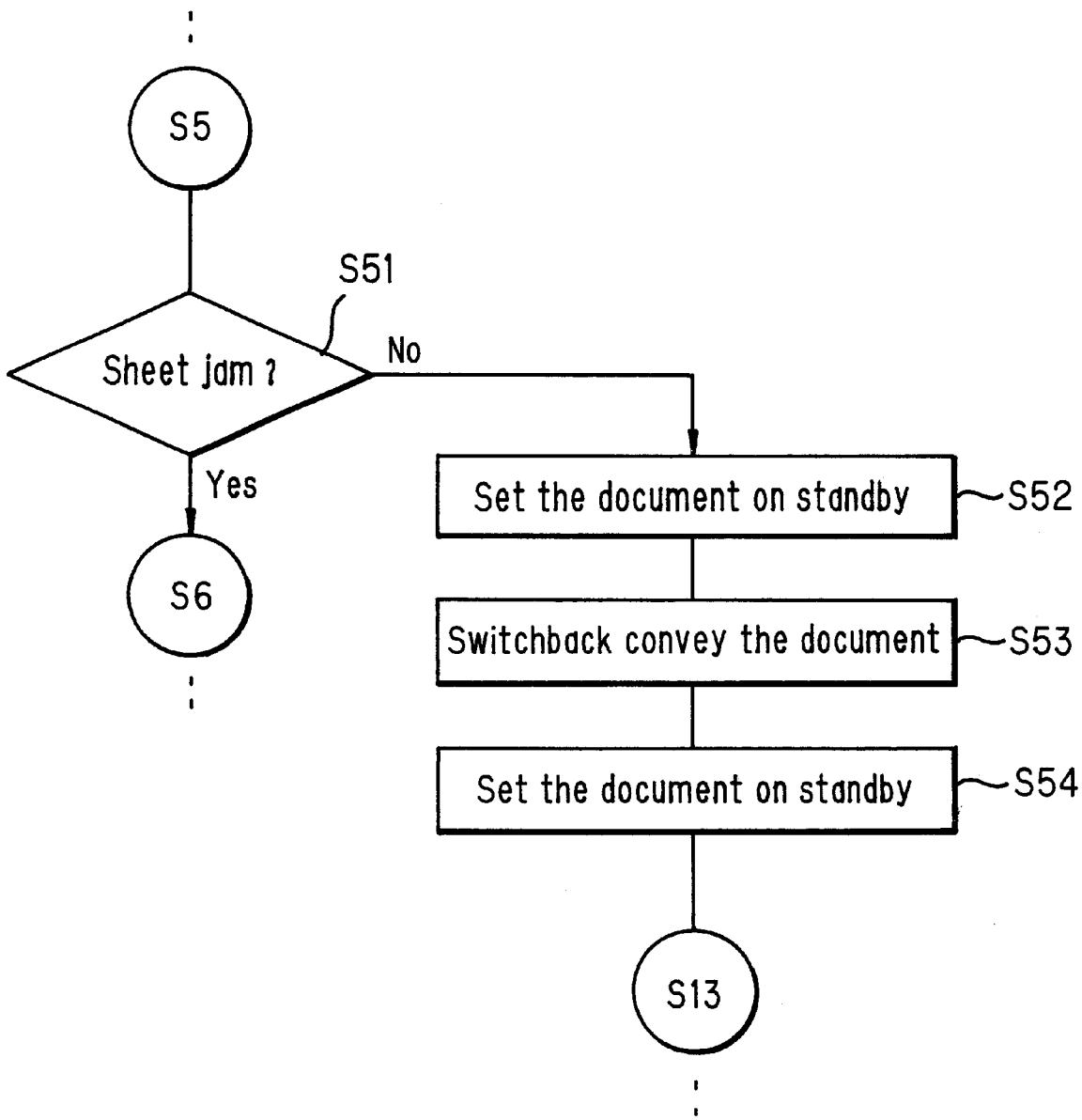
FIG. 5 is a partial control flowchart for explaining another example of document conveyance control when an anomaly is detected on the recording unit side during the operation following the control flowchart shown in FIG. 1.

Illustratively, in FIG. 5, for image forming on the first side of a sheet, if the sheet becomes jammed, this is detected by anomaly detector 54 (S51). If the second side (side B) of a document is being read, the reading operation is stopped while the document continues to be conveyed. At this point, the operation on the recording unit side is stopped.

Then, as the conveyance control of the document is continued as is, the document is passed through discharge path 43 and fed to control roller 7 so that the document is set on standby at the position of control roller 7 in discharge path 43 (S52). Subsequently, control roller 7 is reversed so as to perform switchback conveyance of the document (S53). This is done under control of document re-circulating controller 62. That is, the document is controlled so that it is idly conveyed without stopping at the position of document registration roller 5, passes directly through the reading station, is fed to control roller 7 along discharge path 43 and set on standby at the position of control roller 7 (S54). This operation is the same as Step S9 in FIG. 1.

The document on standby at the position within discharge path 43 is switchback conveyed by control roller 7 and fed to the reading station by document registration roller 5. Thus, the document is set on standby in a state allowing the second side (side B) of the document to be read.

When the standby of the document is complete, the operation goes to Step S13 as explained with reference to FIG. 1, so as to wait for jam cancellation on the recording unit side. When the removal of the jammed sheet is confirmed, the document on standby at the position of control roller 7 is re-circulated at Step S14. Then the operation returns to Step S5, where the second side of the document is read while the image of the original thus read is formed on one side, i.e., the first side of a sheet.

Thereafter, the procedures described already are executed and if no jam is detected, the document is discharged at Step S12. In the above way, instead of simply setting the document on standby in discharge path 43, the document is prepared for being fed to the reading station so as to allow for direct reading of the image on the needed side, thus making it possible to avoid a lengthy operation of recording due to prolonged time of reading with idle conveyance after the restart of the recording operation. Further, since the procedures as above are effected while the operation on the recording unit 20 side is out of operation, this configuration enables effective usage of time without giving the user any extra burden.

(Anomaly Detection at Other Timings on the Recording Unit Side)

Next, when the reading of the second side of the document is completed, the document is switchback conveyed at Step S6 so as to prepare the document for discharge. At the same time, the sheet with the image recorded on one side thereof is also switchback conveyed (S7) so as to prepare the sheet to be image formed on the other side. During this, if sheet jam occurs, this is detected by anomaly detector 54 and the recording operation on the recording unit 20 side is stopped at that detection timing.

That is, suppose that a sheet jam or the like is detected during Step S7 of FIG. 1. At this point, switchback conveyance of the document has already been started at Step S6. Then, instead of setting switching gate 46 into the position indicated by the solid line at Step S8, the switching gate is kept at the position shown by the broken line so that the document having been idly conveyed by switchback conveyance is held at its rear end by control roller 7 in discharge path 43 and set on standby (S9).

In this case, the document is set on standby for being discharged, so it is ready for the second side of the document to be read. Then, the operation goes to Step S13 in order to wait for removal of the jammed sheet. When the recording 20 side becomes ready for restarting the recording operation by jam cancellation as stated above and the operation is restarted, Step S14 and following steps may be effected.

Thus, when anomaly is detected in recording unit 20, the document is set ready for being fed again to the reading station while the recording operation is stopped. Therefore, it is possible to eliminate the time delay until reading is started.

When anomaly in recording unit 20 is detected up to Step S3 or while the image on the first side of a document is being read after the document has started to be fed, the recording operation in the recording unit is stopped the moment the anomaly is detected. The reading operation of the document, however, is continued as long as no anomaly of reading the document occurs, so that the data is stored into RAM 59. When the image on the first side of the document has been completely read, the document is conveyed along discharge path 43 into the standby position at control roller 7. In this standby position, since the document is set so that the image on the second side can be read, any switchback conveyance, which would be needed when an anomaly is detected, is not needed, hence the document is left as it is.

When the standby is completed, the operation goes to Step S13 and the procedures described above are effected. Also in this case, when the recording unit restarts its recording operation, the document is set in such a standby state that the required side to be read will be presented to the reading station. Therefore, it is possible to eliminate time delay for reading when the recording operation is restarted.

The anomaly detection above is that whereby the recording operation cannot be effected due to failures in recording unit 20. One typical example is sheet jamming. Other than such anomalies, anomaly may occur when the read image data is stored in the storage means or RAM 59. More explicitly, when anomaly during the write operation to the memory occurs, this is detected by anomaly detector 54. In this case, it is necessary to read the first side of a document again.

For this purpose, in the control flow shown in FIG. 1, the first side (side A) is read at Step S3 and the read image data is written into RAM 59. In this write operation, memory check is also performed. This memory check can be done using a conventionally known method so as to check write anomaly. During anomaly check, if no anomaly is found, the operation goes directly to Step S4.

If some anomalies are detected, in order to read the same side (the first side) of the document being currently read, the document under reading is sent to control roller 7 by way of discharge path 43 until the rear end of the document is held between control rollers 7. The document is then switchback conveyed by control roller 7. This switchback conveyance is for inverting the document face upside down. The document is idly conveyed by document registration roller 5 through the reading station without being processed and then again fed to control roller 7. The document is once more switchback conveyed to the position of the document registration roller 5 and set on standby for the start of reading. Thereafter, the operation returns to Step S3 and executes each step following the operation flow shown in FIG. 1.

Figure 6:
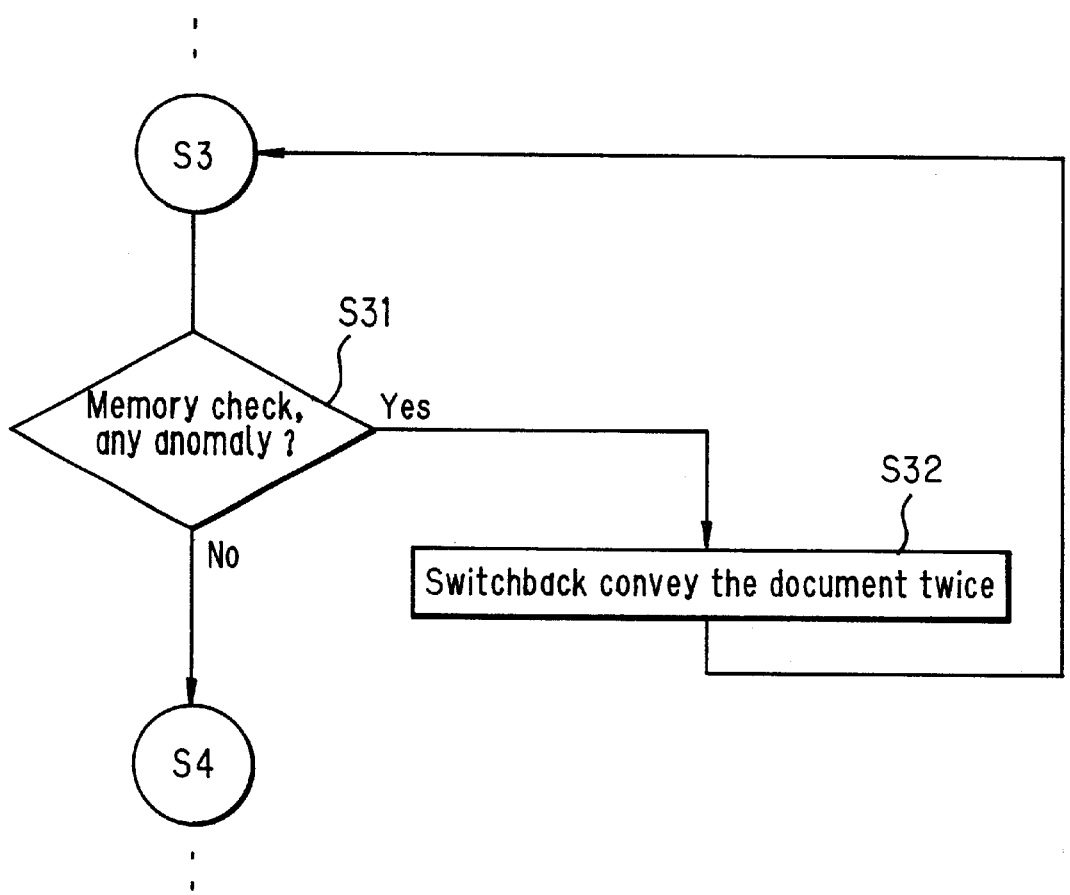
FIG. 6 is a flowchart showing the operation flow for performing the conveyance control of documents based on the detection of a memory anomaly on the recording unit side during the operation following the control chart shown in FIG. 1.

FIG. 6 shows the detail of the above control. In the operation flow shown in FIG. 1, an extra procedure for memory check is added at Step S31 after step S3. If there is no anomaly, the operation goes directly to Step S4. When an anomaly is detected, the document being read, which is presenting the first side to the reading station, is switchback conveyed twice, including this conveyance (S32), then the operation returns to Step S3. That is, the document being currently read is switchback conveyed by way of control roller 7 and again it is switchback conveyed by way of control roller 7 so that the document can set so that it will present the first side to the reading station.

To deal with memory anomaly when the data is read out from the memory, an extra step, i.e., memory check for the read operation as shown in FIG. 6 is inserted after Step S10 shown in FIG. 1. If the read operation cannot be performed correctly, reading of the first side of the document should be carried out. In this case, the document is set at the position of control roller 7 on standby for being discharged. From this state, the document is switchback conveyed by control roller 7 so that the document is idly conveyed over the reading station, passing through discharge path 43 and is set on standby at the position of control roller 7. When the restart of the operation is instructed, the standby document is switchback conveyed so as to present the image on the first side to the reading station for being read. For storing this read image, the operation returns to S3, from where the procedures following the operation flow shown in FIG. 1 are executed.

As has been described heretofore, according to the present invention, before complete discharge of the document to document discharge tray 9, the document having been read is temporarily stopped from being discharged and set on standby. Then, when it is conformed that the sheet with images recorded thereon has been discharged on the recording unit side, the document will be discharged. The document, however, is controlled to be fed to the reading position if a sheet jam etc. occurs. Therefore, the currently existing document conveyance path, that is, inverting path 44 for inverting the document face upside down for reading the images on both sides of a dual-sided document is joined to a point of first conveyance path 42 which is extended to the reading station. This arrangement makes it possible to achieve the object of the invention with a very simple configuration, without the need of providing extra components, the holding means for holding the document after completion of document reading and a special conveyance path for feeding the document from the holding means to the reading station, as disclosed in Japanese Patent Application Laid-Open Sho 60 No. 8865. Since the document being set on standby for being discharged can be switchback conveyed repeatedly as appropriate depending upon each individual situation, it is possible to set the document on standby so that the document will be fed by way of inverting path 44 so as to present the document side needing to be read, to the reading station. By this configuration, the document can be fed at once without delay so as to present the document side to be read, to the reading station when the recording operation is restarted. In this case, the document may be set on standby at the position of registration roller 5, instead of setting the document at the position of control roller 7 in discharge path 43.

(Other Document Conveyance Control Modes)

The above description only referred to the case where the documents are dual-sided and images are formed on both sides of a sheet. Other than the above case, the application of the present invention to the S-D mode, where images are formed on both sides of a sheet for single sided documents, will be described hereinbelow.

Similarly to the above case of the dual-sided documents, single-sided documents are stacked on document tray 2 with the first page face up on the top of the stack. In this condition, duplex printing mode is set.

The topmost document is fed from the stacked documents and is conveyed by way of first conveyance path 42 and set on standby at the position of registration roller 5. Then, the standby document is delivered in time with the operation of the reading station, so that the image of the first page of the document is read. This image data is temporarily stored into the memory, RAM 59. The document image on the first page, or the odd-number paged document has been read, and then the document is conveyed along discharge path 43 and directly discharged by control roller 7 rotating normally. In this case, the document is discharged onto document discharge tray 9 with its read side facedown.

Next, an even-number paged document is delivered and fed to document registration roller 5 in a similar manner. In this case, the document starts to be conveyed when detection sensor 47 detects the rear end of the preceding odd-number paged document.

The document on standby at the position of document registration roller 5 starts to be conveyed in time with the operation of the reading station, so that the image on the second page or the even-number paged document is read sequentially. The image data thus read is supplied directly to laser scan unit 23 of recording unit 20 and is used as is for image forming. That is, the sheet set on standby at registration roller 29 starts to be conveyed so that the image of the document corresponding to the second page or the even-number paged document is formed on one side of the sheet. Then the sheet with an image formed thereon is switchback conveyed by re-circulating roller 38 so that the sheet is re-fed to registration roller 29 by way of re-circulating path 36 and set on standby at that position.

The 2nd paged document is then conveyed to control roller 7 and set on standby at that position with its rear end held between control rollers 7. That is, the document is set on standby for being discharged. When images have been completely formed on both sides of the sheet, the document on standby is discharged by control roller 7 driven in the normal direction. The discharged document is stacked facedown over the previously discharged the 1st paged document. Then the next odd-number paged document is fed and the same process as above is repeated.

When a sheet jam occurs while images are being formed on the sheet, the operation of recording unit 20 is stopped. At this point, control roller 7 is driven in reverse so as to switchback and convey the document on standby at control roller 7 while recording unit 20 is being stopped. Then the document is idly conveyed passing through document registration roller 5 without any halt, and is held by control roller 7 and set on standby. Alternatively, the document set on standby may be switchback conveyed up to document registration roller 5, where it is set on standby.

In this way, the image data read from the odd-number paged document is stored in the memory means or RAM 59 and the image data read from the even-number paged document is supplied directly to the recording unit 20 side for image formation.

Then, the image forming process for the sheet is effected by forming the image based on the image data directly supplied and then inverting the sheet so as to form the image on the underside of the sheet based on the image data loaded from RAM 59, thus enabling image recording on both sides of a sheet.

If a sheet jam is detected while image forming is being effected on this sheet, in particular, while image forming on one side of the sheet is being performed or while image forming on the other side is being performed, the even-number paged document, which has not been discharged, is controlled so as to be fed again. Thereby, the image of the 2nd page document or the image of the even-number paged document is read again. The document thus read is kept on standby while it is held between control rollers 7. When the image forming of a sheet in duplex has been completed and the sheet is discharged, the document kept on standby by control roller 7 as stated above is discharged.

When the image forming operation is stopped in response to detection of an anomaly on the recording unit side, the document feeder 12 side, in particular, the scanner side, will not need any user's manual document handling, whereby it is possible to eliminate the user's burden of troublesome document handling.

As has been described heretofore, in the case where the images of single-sided documents are read so as to form the images on both sides of a sheet, two sheets of documents are grouped as one set so that the images are read in the same manner as that for dual-sided documents. The even-number paged document corresponding to the image on the second side is halted before discharging, and when image forming on the sheet in duplex has been completed (when the sheet having images formed on both sides have been completely discharged), the document halted is discharged. Therefore, when the image forming operation is stopped due to anomaly detection on the recording unit side, such as a sheet jam, etc., the document can be fed again as is to the reading station. As a result, it is possible to eliminate the user's burden.

(Other Examples of Document Conveyance Control of the Present Invention)

In the description heretofore, documents are controlled so as to be fed again or so as to be discharged, based on the assumption that images are formed on both sides of a sheet.

However, the control of the present invention can also be applied in a similar manner to the modes for forming an image on one side of a sheet (D-S mode and S-S mode).

For example, when image forming on one side of sheets is performed for single-sided documents, the image data of a read document is directly supplied to laser scan unit 23 on the recording unit side and is used to directly form the image.

For this case, documents are first fed one by one to document registration roller 5 so that each document is delivered to the reading station and read whilst being conveyed at a constant speed over transparent platen 14. The image data thus read is directly supplied to laser scan unit 23 and is image recorded as is. To transfer the image onto the sheet set on standby at registration roller 29, the starting timing of conveyance is controlled, whereby the image is formed on one side of the sheet. The above document is halted at the position of control roller 7 in a similar manner on standby for being discharged until the sheet having the image recorded thereon is completely discharged.

If a sheet jam occurs, the operation of the recording unit side is stopped while the document halted at control roller 7 is switchback conveyed and idly circulated and set on standby at the position of control roller 7. When the jammed sheet is removed on the recording unit side, this is confirmed and in response to the instruction of the start of image forming, the document set on standby at control roller 7 is switchback conveyed and fed to document registration roller 5 to thereby effect the image reading. As the image is read, the image forming control on the sheet is made.

In this way, when the read image data is directly used for image forming process, the document corresponding to the read data is set on standby at control roller 7 in discharge path 43 instead of being discharged completely. When the sheet with an image formed the has been completely discharged, the document is adapted to be discharged. Thus, this configuration eliminates user's replacement of the document due to sheet jamming.

A similar operation can be effected in the D-S mode in which image forming of dual-sided documents is performed on one side of sheets. In this case, the image on the first side of a document is read and the image is formed thereby. At this point, the dual-sided document is set on standby at the position of control roller 7. When a sheet formed with the image corresponding to the first side is completely discharged, the dual-sided document standing by is switchback conveyed and presented for image reading of the second side by way of document registration roller 5.

As the image is read, the image is directly formed on the recording unit side, without storing the read image data into RAM 59 etc. and the sheet with the image formed thereon is discharged. When the sheet is completely discharged, the document held at control roller 7 is discharged.

Thus, the images on both sides of a dual-sided document are reproduced on two separate sheets. And when these two sheets with images formed thereon are discharged by discharge roller 37 and this is confirmed, the document held at control roller 7 is discharged to document discharge tray 9. If a sheet for image formation in either side of a dual-sided document becomes jammed, the dual-sided document set on standby at control roller 7 is switchback conveyed idly passing through document registration roller 5 in order to allow for reading of the associated image face, and thereafter is set on standby at control roller 7. When the jammed sheet is removed, the document on standby at control roller 7 is sent to document registration roller 5 so that the image face corresponding to the jammed sheet can be read again without delay.

In this way, also in the image forming to one side of sheets, it is possible to eliminate user's replacement handling to the document tray with the necessity of checking the sides of dual-sided documents.

For dual-sided documents, or single-sided documents, when a sheet jam occurs while image formation based on reading the original image is effected, the document after it is conveyed passing over the reading station continues to be conveyed by way of discharge path 43 and is held between control rollers 7 on standby. When the operation of the recording unit side stops in response to jam detection, the standby document is switchback conveyed. That is, in order to read the image corresponding to that recorded on the jammed sheet, again, re-circulation control or switchback conveyance control is made so that the document is set on standby for being read as is.

Therefore, when the image forming operation is restarted, image reading can be effected directly so that no large delay will occur in the image recording operation including the image reading of documents.

In the description of the present embodiment, the document after being read is set on standby with its read end held between control rollers 7 for discharge. With this configuration, it is possible to convey the document to the reading station immediately after jam removal. However, the read document may be set on standby at the position of conveyance roller 6 located downstream of the reader, instead of being set at control roller 7 located before discharge.

In the control flow shown in FIG. 1, from Steps S7 to S9, the document after being read is switchback conveyed and set at the position of control roller 7 in the recording unit, waiting for confirmation of the occurrence of an anomaly such as sheet jam etc. Instead, until the judgement as to anomalies such as sheet jam etc., at Step S11 has been determined, the document may be conveyed at a reduced speed from that when the document is switchback conveyed at Step S7 to when the rear end of the document, passing over the reading station, is set on standby at controller 7 at Step S9.

The above embodiment of the present invention was described referring to an example of an image forming apparatus in which the image of an original is read and converted into an electric signal, which in turn is supplied to laser scan unit 23 to effect image formation. However, instead of such an image forming apparatus, the present embodiment can of course be applied to a document feeder 12 of a scanner configuration in which the read image of an original may be directly focused on photoreceptor 21. Further, in the above description, an electrophotographic recording device was taken as an example of the recording unit constituting the image forming apparatus of the invention, but the recording device should not limited to this. That is, any recording device such as of an ink-jet type, a thermal-print type, which can reproduce an image based on the read image of a document, can be used.

In accordance with the document feeder for the image forming apparatus of the present invention described heretofore, a document after its image has been read is halted at the discharging position instead of being completely discharged. When the recording unit side for recording the image of the document completes the recording and the discharge of the recorded sheet, the document standing by at the discharge position is discharged. When no sheet is discharged due to detection of an anomaly, the document standing by at the discharging position is conveyed to the reading station by way of an inverting path which is provided to allow the images of a dual-sided document to be scanned. With this configuration, it is possible to eliminate the user's burden for handling the documents.

In conclusion, the user does not need to any longer check whether each document is to be read or discharged when an anomaly occurred on the recording side. Therefore, the user only needs to cancel the anomaly on the recording side, whereby it is possible to eliminate the troublesome replacement work of the documents, which would give the user extra burden.

Further, since the configuration of the document feeder employs the currently existing components as they are, this makes it possible to achieve the object of the invention with a very simple manner, without the need of providing extra components, such as special conveyance paths, conveying means, etc.

What is claimed is:

1. A document feeder for an image forming apparatus that includes a document feeder, a reading means for reading the image of a document conveyed to a reading station and a recording unit for reproducing and recording the image read by the reading means on a recording medium, the document feeder comprising:

a document tray having documents stacked thereon in a predetermined manner;

a conveyance path for guiding a document from the document tray to the reading station;

a discharge tray for receiving a document after being read therein;

a discharge path for guiding a document after being read to the discharge tray; and an inverting path extending from the discharge path and joining to the conveyance path for inverting the document face so as to present the reverse side of the document to the reading station, characterized in that:

a document, from which the image or images having been read, to be conveyed by way of the discharge path and discharged to the discharge tray, is kept on standby at a position in the discharge path, instead of being discharged completely;

the recording unit side has an anomaly detector for detecting the shutdown of the recording operation; and the document kept at the discharge position is discharged, under the conditions that the recording medium having thereon the image or images of the document being kept at the discharge path has been discharged without any anomaly detection by the anomaly detector.

2. The document feeder for an image forming apparatus according to claim 1, wherein when the operation of the recording unit side has been shut down based on the detection of an anomaly by the anomaly detector and the anomaly is cancelled so that the recording unit is allowed to operate, the document kept at the discharge position is conveyed to the reading station by way of the inverting path and the conveyance path.

3. The document feeder for an image forming apparatus according to claim 2, wherein the document standing by at the discharge position while the recording unit has been shut down based on the detection of an anomaly is conveyed by way of the inverting path and conveyance path and idly passed over the reading station and is set on standby so that the side needing to be read of the document will be presented to the reading position, before the anomaly of the recording unit is canceled.

4. The document feeder for an image forming apparatus according to claim 1, further comprising:

a storage means for temporarily storing the image data read through the reading station, characterized in that:

the documents stacked are dual-sided documents;

when the images of a dual-sided document is recorded on both sides of the recording medium by presenting the first side of the dual-sided document to the reading station to read the image thereon, inverting the document face whilst conveying it by way of discharge path and inverting path so as to present the second side to the reading station and read the image on thereon, the image of the first side of the document is read so that the read image data is temporarily stored in the storage means, the read image on the second side is directly recorded on one side of the recording medium by the recording unit, then the image based on the image data stored in the storage means is recorded on the other side of the recording medium; and when an anomaly is detected by the anomaly detector during the recording operation of the recording unit, the document after being read is conveyed by way of the inverting path and conveyance path and idly passed over the reading station, a required number of times and is set on standby in the discharge path so that the side needing to be read depending upon the timing of the anomaly detection, will be presented to the reading station.

5. The document feeder for an image forming apparatus according to claim 4, wherein when an anomaly on the recording unit side is detected while the first side of the document is being read, the document as its first side is passing over the reading station is conveyed by way of the discharge path, inverting path and conveyance path and idly passed over the reading station, and then is set on standby in the discharge path, at least.

6. The document feeder for an image forming apparatus according to claim 4, wherein when an anomaly on the recording unit side is detected while the image of the second side is being read and recorded on the recording medium after the first side of the document has been read and the image data thus read has been stored into the storage means, the document as its second side having passed over the reading station is inverted by being conveyed by way of the discharge path, inverting path and conveyance path and idly passed over the reading station, and then is set on standby in the discharge path, at least.

7. The document feeder for an image forming apparatus according to claim 4, wherein the first side of the document being read and the image data thus read being stored into the storage means, the image on the second side being completely read and the read image on the second side being completely recorded on the recording medium, and then when an anomaly on the recording unit side is detected from the time when the image data stored in the storage means is being recorded before the recording medium is discharged, the document from which the image of the second side has been read is inverted by being conveyed by way of the discharge path, inverting path and conveyance path and then is set on standby in the discharge path, and when the recording operation of the recording unit is restarted, the document standing by is directly passed through the inverting path and conveyance path and fed to the reading station so that the image on the second side is read.

8. The document feeder for an image forming apparatus according to claim 5, wherein the anomaly detection during reading the first side of the document is of deficiency of the storing process of the image data into the storage means.

9. The document feeder for an image forming apparatus according to claim 1, further comprising:

a storage means for temporarily storing the image data read through the reading station, characterized in that:

the documents stacked are single-sided documents;

the image of an odd-number paged document is presented to the image station so that the image is read, and then the document is discharged directly to the discharge tray by way of the discharge path, and the even-number paged document is presented to the reading station so that the image is read and then the read document is set on standby in the discharge path;

the image of the odd-number paged document is read and the read image data is stored in the storage means; and when the anomaly detector detects an anomaly while the images are recorded on the recording medium by recording the read image data from the even-number paged document on one side of the recording medium and recording the image data of the odd-number paged document stored in the storage on the other side, the document standing by in the discharge path is conveyed by way of the inverting path, conveyance path and idly passed over the reading station and set on standby in the discharge path while the recording unit is shut down based on the detection of the anomaly detector.

10. The document feeder for an image forming apparatus according to claim 1, wherein the anomaly detector detects an anomaly concerning sheet conveyance on the recording unit side.

* * * * *